United States Patent
Dahl

[11] 3,971,303
[45] July 27, 1976

[54] APPARATUS FOR CONTINUOUS PUFFING

[75] Inventor: Myrland J. Dahl, Northfield, Minn.

[73] Assignee: Malt-o-Meal Company, Minneapolis, Minn.

[22] Filed: Feb. 24, 1975

[21] Appl. No.: 552,328

[52] U.S. Cl............................ 99/323.4; 99/323.9; 222/369; 222/408
[51] Int. Cl.².......................................... A23L 1/18
[58] Field of Search.......... 99/323.4, 323.9, 323.11; 222/368, 369, 408; 198/6, 128, 209, 211

[56] References Cited
UNITED STATES PATENTS

| | | |
|---|---|---|
| 2,475,381 | 7/1949 | Erickson............................ 222/368 |
| 2,886,216 | 5/1959 | Öholm........................... 222/368 X |
| 3,288,053 | 11/1966 | Perttula............................ 99/323.4 |
| 3,730,397 | 5/1973 | Magnus........................... 222/368 X |
| 3,730,729 | 5/1973 | Strommer....................... 99/323.4 X |

*Primary Examiner*—Stanley N. Gilreath
*Assistant Examiner*—Alan Cantor
*Attorney, Agent, or Firm*—G. A. Ellestad

[57] ABSTRACT

Successive charges of grain cereals and a pressurized gaseous fluid are directed into the inlet of a pressurized puffing chamber by a charging valve having a rotor with passageways extending therethrough. The charges are quickly and forcibly fed into the passageways by centrifugal force produced by a rotatable disk having peripheral pockets which receive the grain from a supply source.

8 Claims, 5 Drawing Figures

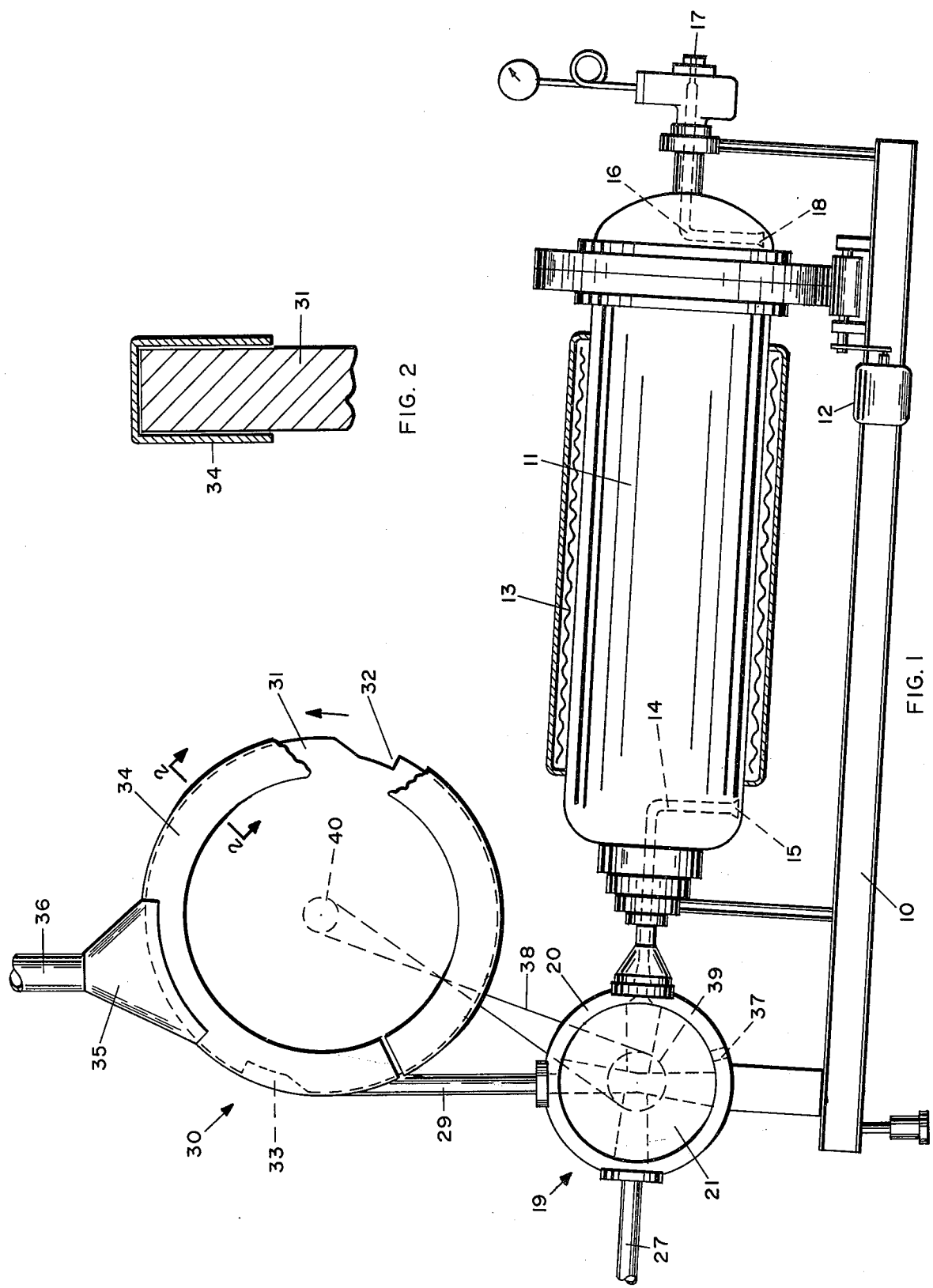

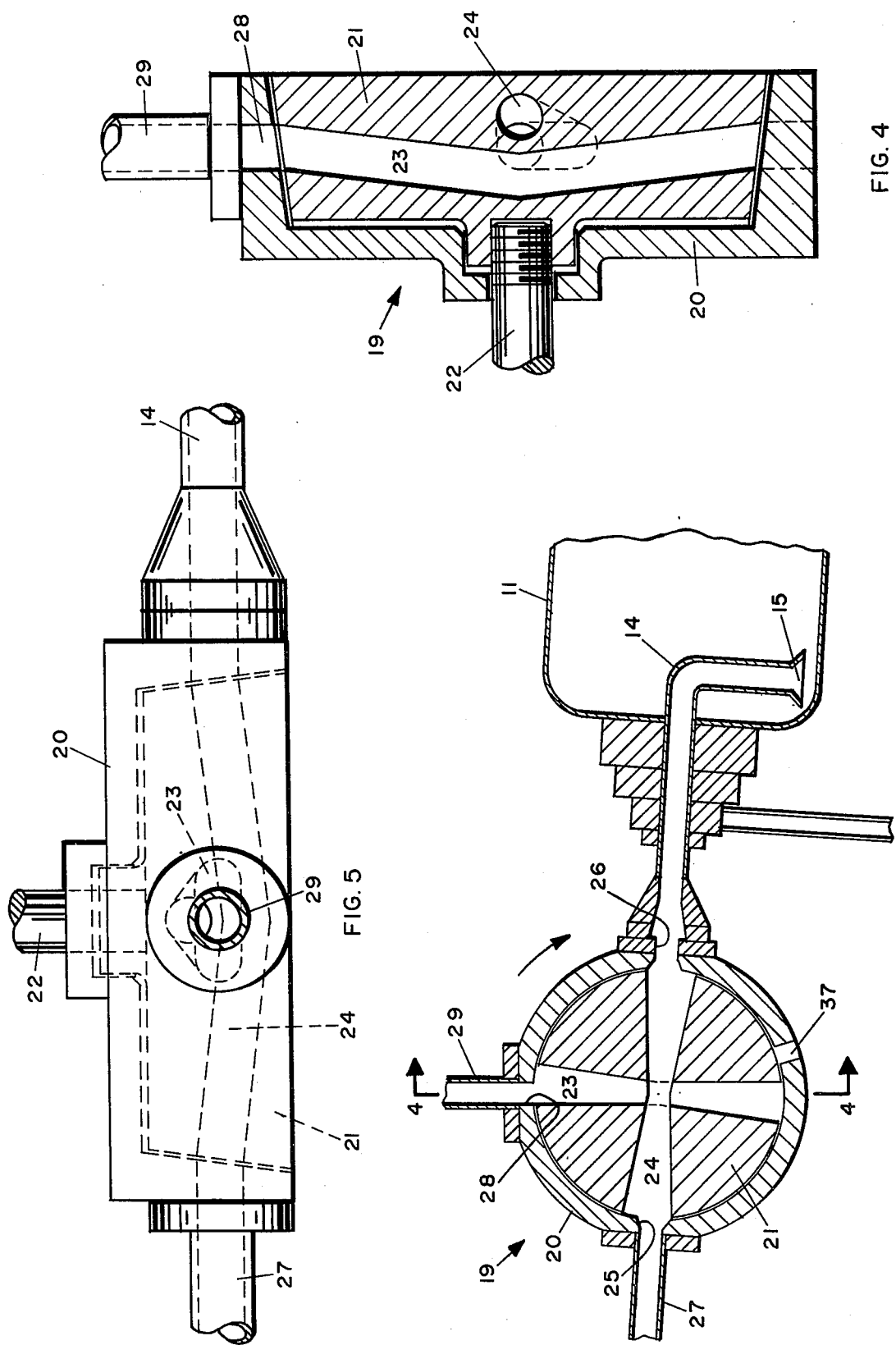

APPARATUS FOR CONTINUOUS PUFFING

BACKGROUND OF THE INVENTION

This invention relates to apparatus which is used to effect continuous puffing of material such as grain cereals and small cereal dough pieces or pellets and more particularly it has reference to means for feeding into the puffing chamber successive charges of the material.

Under one prior art practice, continuous puffing is produced by an apparatus comprising a pressurized puffing gun or chamber having at its respective ends an orifice open to a relatively low pressure zone and an inlet into which successive charges of the material and a pressurized gaseous fluid are directed by a charging valve. Such a valve includes a movable member, such as a rotor, having at least one passageway extending therethrough in a plane which intersects the axis of the rotor. As the rotor revolves, it repeatedly brings the passageway to a position where it receives a charge of material from a supply hopper and thence into alignment with the inlet and a source of pressurized gaseous fluid, such as steam, so that the charge of material and an amount of fluid are forced into the chamber.

The rotor turns continuously and the material to be puffed flows by gravity down into the passageway which has its two end portions enlarged by at least one sharply diverging wall. In practice, the rotor may, for example, be provided with two passageways which are at right angles to each other, non-intersecting and spaced along the axis of the rotor. Steam is generally used as the pressurized gaseous fluid to drive the charges of material out of the passageways and into the chamber where the steam serves as a processing fluid for the material.

Difficulties arise in the operation of such apparatus because the material to be puffed may have a moisture content, by weight, of 5–20 percent so that the material becomes sticky as soon as it is contacted by the steam. Hence, instead of being discrete particles, the cereal grain or dough pellets form sticky masses which adhere to the rotor and especially to the diverging walls at the end portions of the passageways so that complete discharge of the material from the passageway is prevented. The problem is especially troublesome when rice or cereal dough pellets are being puffed. The longer a charge of material, or any part of it, remains in the passageway, the greater is the problem due to sticky material.

Since the material flows from the supply hopper into the passageway by gravity, the rotor must turn slowly enough to permit a significant charge of material to enter the passageway. The production capacity of the apparatus is therefore largely dependent on the speed of rotation of the rotor. In the operation of the prior art apparatus, small amounts of stray stream may rise upwardly from the valve to the supply hopper and thereby add to the problems caused by sticky material.

SUMMARY OF THE INVENTION

An object of the invention is to provide a continuous puffing apparatus embodying improved means for feeding into a pressurized puffing chamber successive charges of material to be puffed together with a pressurized gaseous fluid. Another object is to provide in such an apparatus, having a charging valve for directing steam and the material into the chamber, means for feeding the material into the valve by applied force so as to overcome the disadvantages of the prior art apparatus. A further object is to provide such an apparatus which will have a production capacity greater than that of a comparable prior art apparatus embodying a similar charging valve.

According to the invention, there is provided a heated pressurized puffing gun or chamber having at one end an inlet and at the other end an orifice which is open to a zone of lower pressure than that of the chamber. Successive charges of the material to be puffed are directed into the inlet of the chamber by a charging valve including a rotor having two non-intersecting passageways extending therethough substantially at right angles to each other and intersecting the axis of the rotor. As the rotor revolves, each passageway is brought first into position to receive a charge of material from supply means and then into communication with the inlet of the chamber and a source of pressurized steam whereby the charge of material and steam are forced into the chamber, after which the cycle is repeated. When a passageway is in material receiving position, a charge of material from the supply means is thrown forcefully through a conduit into the passageway by centrifugal force produced by a rotatable disk having two spaced peripheral pockets which receive material from the supply means.

By use of the centrifugal throwing device, a charge of material of a given amount is fed into a passageway of the rotor more quickly than by the prior art gravity feed. The rotor may therefore turn faster so that the charge of material is more quickly expelled from the passageway into the chamber. Since the dwell time of a charge of material in a passageway is minimized, the duration of contact between steam and material is lessened with the result that little, if any, sticky material mass is formed so that the entire charge may be driven from the passageway into the chamber. Greater production capacity of the puffing apparatus will result because for a charge of material of a given amount the rotor may turn faster than under prior art practices. The downward draft produced in the conduit prevents stray steam from rising upwardly to the supply source and thereby eliminates a possible further cause for sticky material.

BRIEF DESCRIPTION OF THE DRAWINGS

FIG. 1 is a diagrammatic view with parts in section of a continuous puffing apparatus embodying the invention.

FIG. 2 is a sectional view taken on line 2—2 of FIG. 1.

FIG. 3 is a sectional view showing the charging valve and chamber inlet.

FIG. 4 is a sectional view of the valve taken on line 4—4 of FIG. 3.

FIG. 5 is a top view of the charging valve.

DESCRIPTION OF PREFERRED EMBODIMENT

A preferred embodiment of the invention is shown in the drawings wherein 10 indicates a base on which the pressurized cylindrical puffing gun or chamber 11 is mounted for rotation, by means of motor 12, about its axis which is inclined from the horizontal. The chamber 11 may be heated by means such as electrical heating coils 13 positioned along the outer surface of the chamber. One end of chamber 11 has an inlet formed by the fixed pipe 14 which extends inwardly along the axis of the chamber and thence downwardly to terminate with its open end 15 adjacent to the inner surface of the cylindrical chamber 11. The opposite end of chamber 11 is provided with a fixed pipe 16 which extends outwardly through an axial hole in the end of chamber 11 and terminates in the puffing nozzle or orifice 17. Within the chamber 11 the pipe 16 has a portion which extends radially to bring its open end 18 adjacent to the inner surface of chamber 11. The two pipes 14 and 16 having portions extending along the axis of the cylindrical chamber 11 are fixedly held as the chamber 11 is rotated about its axis.

Successive charges of the material to be puffed are directed into the chamber inlet together with pressurized gaseous fluid by charging valve means indicated generally at 19, and having the fixed cup-shaped outer casing 20. Rotatably mounted within the fixed casing 20 is the rotor 21 having a frusto-conical shape and with its tapered peripheral surface tightly fitted to the outwardly diverging inner surface of casing 20 to provide a gas-tight fit as the rotor 21 is turned by power applied to shaft 22. Formed in the rotor 21 and extending therethrough at right angles to each other are the two passageways 23 and 24 which are axially spaced, non-intersecting and pass through the axis of rotor 21.

The fixed casing 20 has two aligned, oppositely positioned ports 25 and 26 with port 25 open to means providing a source of pressurized gaseous fluid through pipe 27 and port 26 open to inlet pipe 14. Lying in a plane between ports 25 and 26 and formed in casing 20 is a third port 28 which is in communication with conduit 29. As the rotor 21 turns clockwise, each passageway is brought repeatedly first into communication with port 28 and then into communication with the aligned ports 25 and 26 for a purpose which hereinafter will be described.

The material to be puffed, such as wheat, is fed by successive charges into the passageways of the valve means 19 by feeding means including propelling means for forcibly and quickly propelling charges of material into the passageways. In a preferred embodiment, the feeding means includes a propelling means in the form of a centrifugal thrower, indicated at 30, and the conductor means as pipe 29 to provide communication between the centrifugal thrower 30 and the valve means 19. The centrifugal thrower 30 comprises the rotatable member such as disk 31 which has formed in its periphery the two material receiving pockets 32 and 33 which are diametrically opposite each other. A fixed shroud 34 covers the periphery and adjacent side portions of the disk 31. The upper part of the shroud 34 has an opening covered by hood 35 connected to pipe 36 into which material from a source flows by gravity so that the space under the hood 35 serves as supply means as it is normally filled with material to be puffed. The conduit 29 extends downwardly from, and in substantially tangential relation to, the shroud 34 to provide communication between an opening in the shroud and the valve means. The clearance between the disk 31 and the shroud 34 is less than the smallest dimension of a grain of material. As the disk 31 rotates counterclockwise, as seen FIG. 1, charges of material from the supply under hood 35 will be deposited in the pockets 32 and 33 and thrown by centrifugal force down through conduit 29 into the passageways 23 and 24 as they are brought successively into material receiving position upon rotation of the rotor 21.

In operation, the material to be puffed, such as wheat, is preheated to about 150°–220° F. and fed down the pipe 36 to the hood 35. As the disk 31 rotates counter-clockwise, a charge of wheat is received in one of the peripheral pockets on the disk and thrown by centrifugal force downwardly through the conduit 29 and into, for example, the passageway 23 which is in material receiving position as shown in FIG. 3. With the rotor 21 turning clockwise, the charged passageway 23 is moved into communication with the aligned ports 25 and 26 whereupon the charge of wheat and a pressurized gaseous fluid, such as superheated steam at 300°–600° F. and 80–220 p.s.i., are brought into mutual contact and the charge of wheat and fluid are forced out of the passageway, into the inlet pipe 14, out of the opening 15 and into the chamber 11.

The wheat is processed within the heated chamber 11 as it is tumbled and mixed by rotation of the chamber and moved to the lower end of the chamber where it enters the open end 18 of pipe 16 and is expelled out through the puffing orifice 17. The wheat is puffed when it leaves the high pressure chamber 11 and passes out of the orifice 17 into a zone, such as the atmosphere, having a pressure which is lower than the pressure of the chamber 11. After the charge of wheat has been forced out of the passageway 23 into the inlet pipe 14, further rotation of the rotor 21 will bring the passageway into communication with port 37 formed in the casing 20 to permit the release of any steam which remains in the passageway before it is moved into material receiving position.

By forcefully propelling the charges of material into the passageways by means of the centrifugal throwing disk 31, a charge of material of a given amount can be deposited in a passageway more quickly than under prior art practices which utilize gravity flow. Hence, the rotor 21 may turn faster so the charge of material will be more quickly forced into the puffing chamber 11. With the dwell time of a charge of material within a passageway greatly reduced, there is much less time for the material to form small or large sticky masses by contact of the material with steam. This problem is especially serious when puffing grains of polished rice or pellets of cereal dough since these materials tend to become sticky when contacted by steam.

Since the valve rotor 21 turns faster, the production capacity of the apparatus is increased so that a given amount of material may be puffed more quickly than under prior art practices. By using means for forcefully and quickly feeding charges of material into the passageways of the rotor, it is not necessary to form the mouth or end portions of the passageways with sharply diverging wall portions in order to permit gravity flow of a significant charge of material into a passageway. Hence, as shown in FIGS. 3 and 4, the passageways may be formed with straight wall portions so that the charges of material can be quickly and completely forced by the high pressure gaseous fluid into the inlet pipe 14. The downward draft or thrust produced by feeding a charge of material through conduit 29 will prevent any stray steam in the valve 19 from rising in conduit 29 and thereby eliminate a possible source of trouble due to sticky material.

In a successfully operating embodiment of the invention the puffing chamber 11 is 50 inches in length, 30 inches in diameter and provided with an orifice 17 which is one-half inch in diameter. The valve rotor 21 has a maximum diameter of 16 inches and is provided with two passageways with the configuration shown in FIGS. 3 and 4. The centrifugal throwing disk 31 has a diameter of 36 inches and is rotated at 72 R.P.M. The valve rotor 21 is rotated at 36 R.P.M. by power means applied to shaft 22. The rotation of the disk 31 is synchronized with the rotation of the valve rotor 21 by any suitable means such as link belt, indicated at 38, connecting sprockets 39 and 40 carried, respectively, by the shaft 22 and a shaft secured to disk 31. This apparatus when operated at the temperatures and pressures mentioned above has a production capacity of about one cubic foot per minute for wheat, rice or cereal dough pellets.

Although one form of the invention has been shown and described in detail, it will be apparent to those skilled in the art that various modifications can be made without departing from the spirit or scope of the invention as pointed out in the appended claims.

I claim:

1. An apparatus for continuous puffing of food material capable of being puffed comprising a pressurized puffing chamber having at its ends, respectively, an inlet and an orifice which is open to a zone of lower pressure than that of the chamber, material supply means, valve means for directing into the inlet successive charges of material and a pressurized gaseous fluid comprising a valve member having at least one passageway extending therethrough, said valve member being movably mounted to repeatedly bring the passageway into and out of communication with said inlet and into and out of position to receive a charge of material from the supply means, feeding means for feeding a charge of material into the passageway each time it is in material receiving position, said feeding means including propelling means for receiving separate successive charges of material from the supply means and applying force thereto for forcibly propelling each charge into the passageway, and means for directing a stream of pressurize gaseous fluid into the passageway after it has received a charge of material and it is in communication with the inlet whereby the fluid and material are brought into mutual contact and then forced into the chamber and expelled through the orifice to cause puffing of the material.

2. The structure of claim 1 wherein the feeding means includes conductor means in communication with the valve means and the propelling means comprises a rotatable member for receiving each charge of material and centrifugally throwing it through the conductor means into the passageway.

3. The structure of claim 2 wherein the rotatable member is a disk having at least one material receiving pocket on its periphery and the conductor means is a conduit extending from the periphery of the disk to the valve means.

4. The structure of claim 3 wherein the valve member is rotatable, the chamber is a cylinder mounted to rotate about its axis which is inclined from the horizontal towards the orifice and means are provided to heat the cylinder.

5. The structure of claim 4 wherein the disk is mounted above the valve means, a shroud covers the periphery of the disk and adjacent side portions, the upper portion of the shroud is open to the material supply means and the conduit extends downwardly from an opening in the shroud to the valve means.

6. The structure of claim 1 wherein the passageway is defined by continuous straight wall portions which extend inwardly and directly from the outer surface of the valve member.

7. The structure of claim 6 wherein the propelling means comprises a rotatable member for receiving each charge of material and centrifugally throwing it into the passageway.

8. The structure of claim 7 wherein the valve member is mounted to turn about its axis and extending through the member are two passageways which are axially spaced, pass through the axis of the member and are substantially at right angles to each other.

* * * * *